Aug. 11, 1953　　　　　S. F. UDSTAD　　　　2,648,536
SPRING MOUNTING FOR VEHICLES
Filed Feb. 2, 1951

INVENTOR
SIGVALD F. UDSTAD
BY
*Robert A. Shield*
ATTORNEY

Patented Aug. 11, 1953

2,648,536

UNITED STATES PATENT OFFICE 2,648,536

SPRING MOUNTING FOR VEHICLES

Sigvald F. Udstad, Berwick, Pa., assignor to American Car and Foundry Company, New York, N. Y., a corporation of New Jersey Application February 2, 1951, Serial No. 209,085

3 Claims. (Cl. 267—33)

This invention relates to spring mountings in general but in particular to mountings for use in connection with railway vehicles having extremely low center of gravity.

In direct supported vehicles such as shown in Omar Patent 2,462,666, it is necessary to obtain very soft spring loading to prevent excessive transmission of noise from the rail into the car body. Due to the housing of the wheels within a well projecting upwardly into the vehicle, noise is extremely disturbing and it has been found that the necessary long springs develop a secondary transverse vibration which increases the rail noises. It is an object, therefore, of the present invention to provide a spring mounting in which the noise transmitted to the vehicle is materially reduced.

A further object of the invention is the provision of a spring mounting having metallic and non-metallic springs acting in series and each serving to dampen vibrations set up in the other.

A still further object of the invention is the provision of a combined spring pocket and a rubber-in shear unit which overlaps and houses the upper end of the metallic spring.

A yet further object of the invention is the provision of a spring mounting formed of metallic and non-metallic units acting in series to support the load but overlapped in order to cut down overall height and possibility of harmful vibration in the metallic unit.

These and other objects of the invention will be apparent to persons skilled in the art from a study of the following description and accompanying drawings in which.

Figure 1:
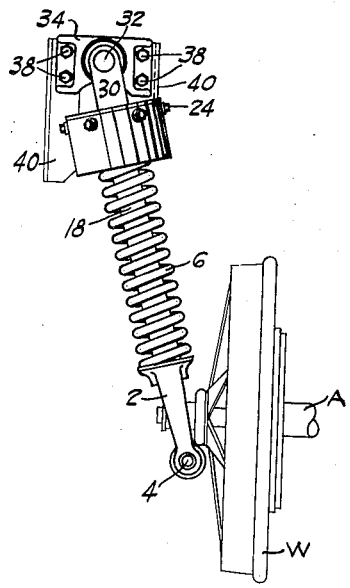
Fig. 1 is an end view showing the improved mounting applied between the axle and car body.
Figure 2:
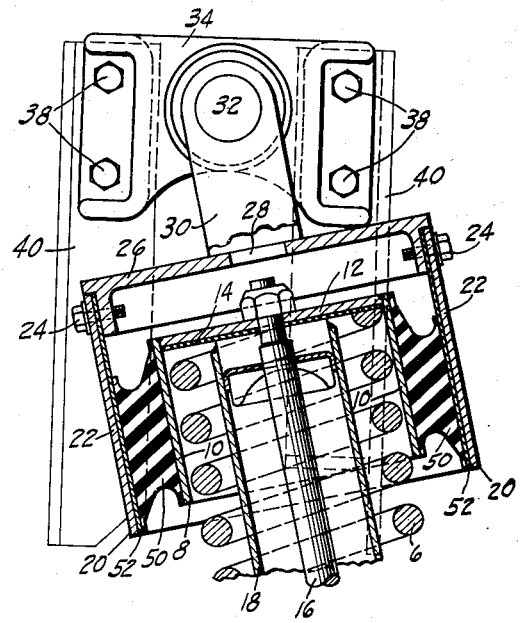
Fig. 2 is an enlarged view taken substantially on line 2—2 of Fig. 3.
Figure 3:
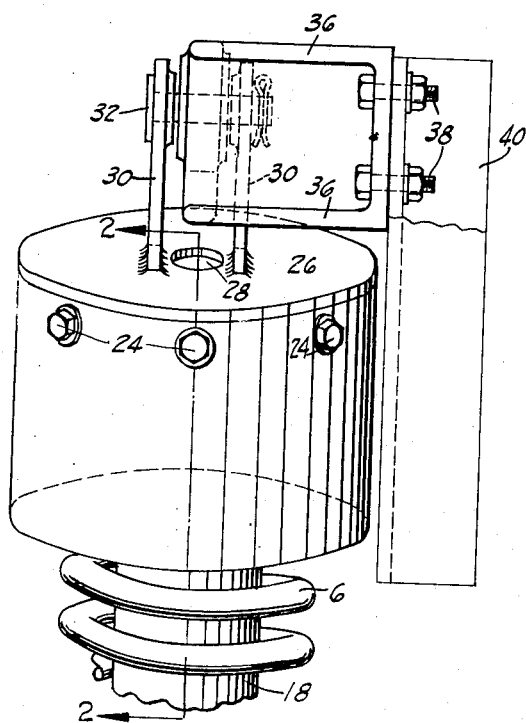
Fig. 3 is an enlarged view showing the combined shear unit and spring pocket.

Referring now to the drawings in detail, it will be seen that the complete car has not been shown but reference may be had to Patent 2,462,666 as disclosing the type of car to which the unit may be applied. As shown, the axle A is supported on wheel W with one end of the axle extending outwardly of the wheel and having journaled thereon a yoke or support member 2, this member being pivoted as at 4 so as to swing axially of the wheel in order to accommodate movement of switches and around curves. A coil spring 6 bears at its lower end on the support structure 2 and has its upper end extending into a downwardly opened inner cup-shaped member 8. This inner cup-shaped member is formed with circular side walls 10 to one edge of which is welded or otherwise attached a flat plate 12. On the inner side of this flat plate is preferably placed a fiber disk 14 which is adapted to bear directly on the upper end of the coil spring 6. The side walls 10 have an inside diameter slightly greater than the outside diameter of the coil spring so that the coils are guided within the cup member which thereby serves as a guide and housing for the upper end of the spring. Bottom plate 12 is centrally pierced to receive a long bolt 16 connected to the piston of a shock absorber housed within the dust guard 18.

In order to impose the load on the spring, an outer downwardly opened cup member 20 is provided, and this member is formed with circular side walls 22 connected as by bolts or other means 24 to bottom wall member 26. This bottom wall member is centrally pierced as at 28 so that in case of failure the upper end of bolt 16 may pass therethrough allowing bottom wall 12 of the inner cup to contact the bottom wall 26 of the outer cup. Upstanding ears 30 are welded or otherwise secured to the bottom wall 26 of the outer cup member, and these ears are pivotally connected as at 32 to a transversely extending wall 34 of a bracket member. The transverse wall 34 is connected by longitudinally extending channel-shaped walls 36 and fastening means 38 to rigid angle members 40 forming part of the vehicle structure for ears forming part of the portion 13 of Patent 2,462,666.

In order to impose the vehicle load on the spring a rubber or other resilient element 50 is bonded or otherwise secured to the outer surface of circular wall 10 and is also bonded to a segmental outer wall member 52. During assembly of the parts the segmental outer wall member will be squeezed inwardly thereby compressing the rubber element 50 and permitting insertion of the segmental shell into the side walls 22 previously referred to. The fastening bolts 24 will prevent any slippage between the segmental members 52 and the walls 22 of the outer cup member.

It will thus be seen that a shear unit has been provided formed of an inner and an outer downwardly opened cup member joined together by a non-metallic resilient material such as rubber. This cup unit is pivotally mounted on the vehicle at a point substantially in alignment with the axis of the shear unit and of the coil spring 6 thus preventing any eccentric loading. The shear unit also overlaps and houses the upper end of the coil spring thereby forming not only a resilient shear unit but also a guide and spring housing for the upper end of the coil spring 6. The load transmitted from the vehicle will pass through the resilient non-metallic material 50 and into the coil spring 6 with the two acting in series to transmit the load. Due to the overlapping of the shear unit and its encircling of the spring, the loads will be transmitted without any eccentricity and without increasing the height over that necessary for the coil spring alone.

While the invention has been described more or less in detail with specific reference to the form shown, it is obvious that various modifications may be made without departing from the scope of the invention as defined by the following claims.

What is claimed is:

1. In a resilient mounting for railway vehicles the combination of, an axle, a yoke pivotally mounted on the axle for swinging movement axially thereof, a metallic spring supported at its lower end on said yoke, an inner downwardly open cup-like member resting on and housing the upper end of said spring, an outer downwardly open cup-like member having side walls overlapping the side walls of said inner cup member, means pivotally connecting said outer cup-like member to said vehicle for swinging movement about an axis substantially parallel to said first-named pivotal mount, and rubber bonded to the overlapping side walls of the cup-like members and acting in shear to transmit load from the vehicle to the spring.

2. In a resilient mounting for railway vehicles the combination of, an axle, a support movably mounted on the axle, a resilient metallic member bearing at its lower end on said support and having its longitudinal axis extending upwardly and outwardly therefrom, a rubber shear unit encircling the upper end of said resilient metallic member and bearing thereon to transmit load thereto, a bracket rigidly attached to the vehicle, and means pivotally connecting said bracket and shear unit, said means including a pivot pin having its axis intersecting the axis of said resilient metallic member and substantially perpendicular to a plane through the axle and the resilient metallic member to thereby permit endwise swinging of said axle, member and shear unit.

3. In a resilient mounting for railway vehicles the combination of, an axle, a support movably mounted on the axle, a coil spring bearing at its lower end on said support, and a combined spring pocket and rubber shear unit pivotally connected to said vehicle and bearing on the upper end of said spring to transmit load thereto, said unit comprising an inner member encircling and overlapping the upper end of said spring to serve as a spring pocket and spring guide, an outer member connected to the inner member by rubber bonded to each, and a base member removably secured to said outer member and formed with a projecting arm adapted to receive a pin for pivotally connecting the base to the vehicle.

SIGVALD F. UDSTAD.

References Cited in the file of this patent

UNITED STATES PATENTS

| Number | Name | Date |
|---|---|---|
| 2,181,908 | Mussey | Dec. 5, 1939 |
| 2,242,852 | Flowers | May 20, 1941 |
| 2,557,354 | Kivell | June 19, 1951 |

FOREIGN PATENTS

| Number | Country | Date |
|---|---|---|
| 561,659 | Great Britain | May 30, 1944 |